E. H. W. WEIBULL.
ROLLER BEARING.
APPLICATION FILED APR. 26, 1919.
1,335,766. Patented Apr. 6, 1920.
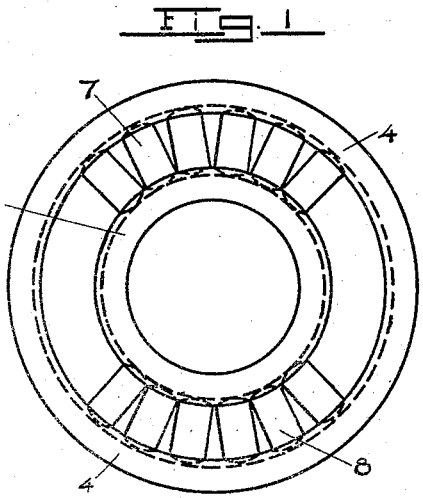
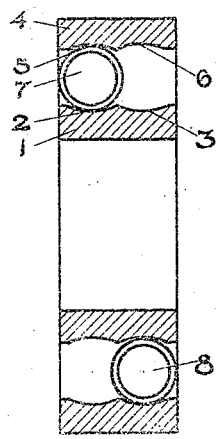 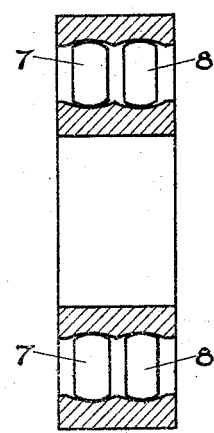
Inventor.
E.H.W. Weibull.
By H.R. Kerslake
Atty.

UNITED STATES PATENT OFFICE.

ERNST HJALMAR WALODDI WEIBULL, OF GOTTENBORG, SWEDEN, ASSIGNOR TO NORDISKA KULLAGER AKTIEBOLAGET, OF GOTTENBORG, SWEDEN.

ROLLER-BEARING.

1,335,766.　　　　　Specification of Letters Patent.　　Patented Apr. 6, 1920.

Application filed April 26, 1919. Serial No. 292,926.

*To all whom it may concern:*

Be it known that I, ERNST HJALMAR WALODDI WEIBULL, subject of the King of Sweden, residing at Gottenborg, in the county of Gottenborg and Bohus and Kingdom of Sweden, have invented certain new and useful Improvements in or Relating to Roller-Bearings, of which the following is a specification.

It is known that in roller-bearings with the rollers in the shape of spheres with two opposite sides cut away or as solids of revolution of approximately similar shape, the rollers may be inserted into the bearings without the provision of special filling-openings, provided the rollers be proportioned in a certain relation to the dimensions of the bearing. Such a proceeding may be employed in the case of single-row bearings by placing the outer- and inner-rings of the bearing eccentrically to each other while inserting the rollers, even in case the bearing-rings are provided with race-ways.

The same proceeding may also be employed in the case of multiple-row roller-bearings with similar rollers, provided the roller-races are so far apart from each other, that the rollers can be inserted by being turned about at right angles to their normal operative position and afterward can be turned back again into said normal position without any impediment from the rollers in the adjacent roller-race.

If on the contrary the roller-races are so close to each other, that the turning operation just described cannot be executed, without causing a roller in one race to foul a roller in the adjacent race, the above mentioned method of inserting the rollers evidently cannot be adapted.

The present invention refers to a method of inserting the rollers in a double-row roller-bearing without need of any filling-openings, even if the roller-races are so close to one another, that the rollers, placed in normal operative position between the bearing-rings, nearly come into contact with one another.

The invention is characterized mainly therein, that the rollers are first inserted in one of the races, turned about at 90° to their ordinary operative position, and pushed so closely together, that they occupy only about half of the circular space between the bearing-rings. Then the rollers in the other race are inserted, also turned at 90° to their ordinary operative position, and pushed closely together along the one half of the circumference of their race-way. Then the rollers are turned about in pairs, one roller in each race-way, so that they come into their ordinary operative position, and are afterward slid along the race-ways at equal distances, on the still unoccupied portion of the interspace between the bearing-rings, until every roller has become thus turned around and moved into its proper place.

The annexed drawing shows, in a diagrammatical way, how the above-named procedure is performed, viz:

Figure 1 illustrates a side view of a double-row roller-bearing with its disk-shaped rollers inserted into the two race-ways in two diametrically opposite groups.

Fig. 2 shows a cross-section of the same roller-bearing with its rollers inserted in the above-mentioned transverse position.

Fig. 3 shows a cross-section of the same roller-bearing with its roller inserted and turned into their ordinary operative position.

The inner-ring of the bearing is denoted by 1, its two race-ways by 2 and 3. The outer-ring is denoted by 4, its race-ways by 5 and 6. The rollers are marked 7 in one of the race-ways and 8 in the other.

The method of insertion allows of arranging the race-ways in such close proximity to each other, that the rollers 7 in the one race-way come so near to the rollers 8 in the adjacent race-way, as to prevent the rollers from turning about out of their normal operative position. Such a turning motion would bring the rollers in the one race-way into collision with the rollers in the other race-way; consequently all the rollers are kept in their normal position without special roller-cages being employed.

This procedure may be adapted in connection with the employment of rollers having a cross-section of any arbitrary shape, and it is consequently not restricted exclusively to rollers of a particular shape.

Having now particularly described and ascertained the nature of my said invention and in what manner the same is to be performed, I declare that what I claim is:

The method of inserting rollers into double roller bearings consisting in arranging the rollers at right angles to their normally operative positions and inserting them into the adjacent roller races and pushing them close together along opposite halves of the interspaces between the bearing-rings, and finally simultaneously turning one roller in each race severally into their normally operative positions and moving them along the raceways at equal distances on the unoccupied portions of the interspace between the bearing-rings.

In testimony whereof I have affixed my signature in the presence of two witnesses.

ERNST HJALMAR WALODDI WEIBULL.

Witnesses:
BIRGER NAAE,
ALLAN ODHQUIST.